May 5, 1942.  F. E. WOLCOTT  2,281,652
COFFEE MAKER BOWL SUPPORT
Filed May 17, 1939
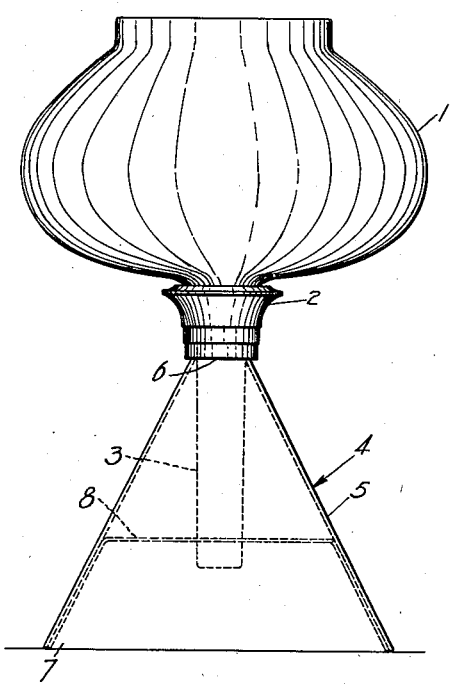
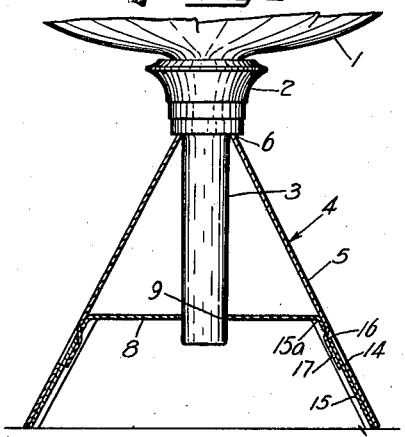
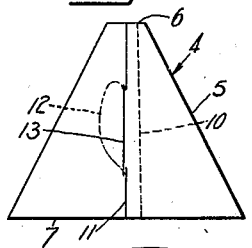
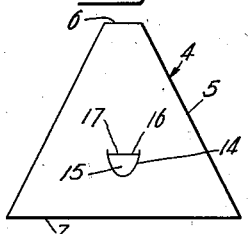
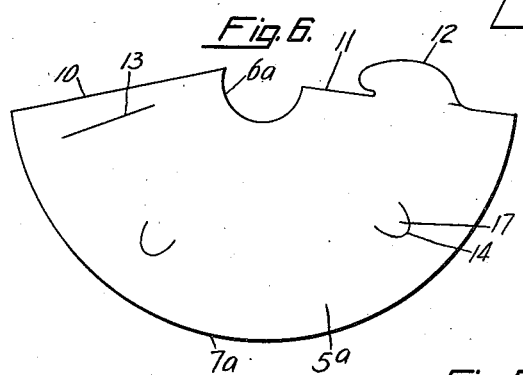
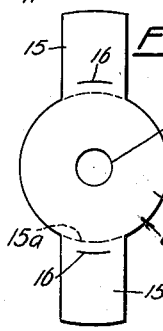
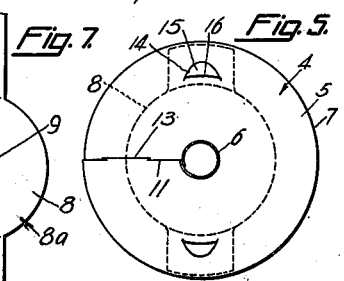
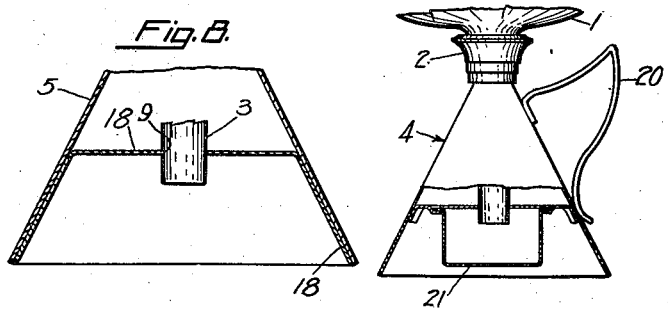
INVENTOR
Frank E. Wolcott
By
ATTORNEY Patented May 5, 1942

2,281,652

UNITED STATES PATENT OFFICE 2,281,652

COFFEE MAKER BOWL SUPPORT

Frank E. Wolcott, West Hartford, Conn., assignor to The Silex Company, a corporation of Connecticut Application May 17, 1939, Serial No. 274,235

4 Claims. (Cl. 65—65)

My invention relates to coffee makers.

It has among its objects to provide an improved support for coffee maker bowls and, more particularly, for the upper bowls for such coffee makers. A further object of my invention is to provide such an improved support adapted to shroud the depending bowl stem and one which is of an improved construction and adapted to cooperate in an improved manner with such a bowl to prevent cocking or canting thereof while supported thereon. Still further objects of my invention are to provide such an improved display device for such a bowl and one which is adapted to be readily and inexpensively produced of paper or the like, and to be shipped flat and readily assembled and to produce an exceedingly attractive and stable bowl support. These and other objects and advantages of my improvements will, however, hereinafter more fully appear.

In the accompanying drawing, I have shown for purposes of illustration three embodiments which my invention may assume in practice.

In the drawing—

Figure 1 is a side elevation of one form of my improved display device supporting a coffee maker upper bowl, certain parts being shown in dotted lines to facilitate illustration;

Fig. 2 is a central vertical sectional view of the display device in operative position, the upper portion of the coffee maker bowl being broken away;

Fig. 3 is a side elevation of the conical display device per se, the same being turned so as to show the connected edges thereof;

Fig. 4 is a like view but at right angles to Figure 3 and showing the holding tabs;

Fig. 5 is a top plan view of the device shown in Figures 3 and 4;

Fig. 6 is a plan view of one of the blanks from which the display device is formed;

Fig. 7 is a like view of the other element of the display device;

Fig. 8 is a view similar to Figure 2 but showing a modified construction, and

Fig. 9 is a like view of a further modified construction.

In the construction shown in Figures 1 to 7, I have illustrated a coffee maker upper bowl 1 carrying a usual seal 2 on the upper end of a usual depending stem 3, this bowl being supported on and having its stem 3 extending into an improved display device therefor, generally indicated at 4, which cooperates to support the bowl 1 stably in position while maintaining the same against canting or cocking, all as hereinafter more fully described.

Referring more particularly to my improved construction, it will be noted that the display device includes a hollow conical member 5 having a reduced, open, upper end 6 which underlies and supports the lower edge of the seal 2, and an enlarged, open, bottom end 7 which rests upon a table or other suitable support. Further, it will be noted that intermediate these ends 6 and 7 a bridging member 8 is provided which has a socket 9 disposed in vertical alignment with the opening through the upper end 6 and is adapted to receive the lower end of the stem 3 of the bowl 1 after it has been passed through the end 6. Thus, when the portions 5 and 8 are connected together and disposed as shown in Figure 2, it will be evident that a support is provided for the bowl 1 which has a large and stable base and which attractively displays the attractive lines of the bowl, while cooperating with the stem thereof effectually to prevent cocking or canting of the bowl at the same time that it shrouds this merely utilitarian stem.

In Figures 3 to 7, I have shown a preferred form of conical supporting member and one which is especially adapted to use in a display device and to be made of paper or the like, such as aluminum foil covered cardboard. In Figure 6, the blank as cut to produce the member 5 is illustrated at 5a. In this blank the top and bottom supporting edges 6 and 7 are formed by curved edges 6a, 7a, of which the edge 6a is non-symmetrical and longer on one side than the other of the vertical center line of the blank, while the edge 7a is symmetrical. Further, it will be noted that straight edge portions 10 and 11 are provided, both of which slope downwardly slightly from opposite ends of the edge 6a. A projecting hook 12 is also provided on the lower edge 11 and adapted to be received and hooked in a slot 13 spaced within the edge 10 when the member 5 is formed, as illustrated in dotted lines in Figure 3. Further, it will be noted that at points on opposite sides of the vertical center line of the blank shown in Figure 6, angularly disposed U-shaped cut-outs 14 are provided which are located directly opposite one another when the conical member 5 is formed, as shown in Figure 2.

Cooperating with the blank shown in Figure 6, is also the cooperating blank 8a shown in Figure 7. In this blank, it will be noted that the portion 8 is annular and surrounds the stem receiving opening 9, while elongated oppositely projecting extensions 15 are provided on opposite sides of the portion 8 and transverse slits 16 are provided in these extensions to receive the flaps 17 formed by the U-shaped cut-outs 14, heretofore described, when the parts are assembled, as shown in Figures 2 and 4. Here it will also be noted that the portions 15 are connected by scoring lines 15a to the portion 8 and tend to spring outward to the angular position shown in Figure 2, while it will further be noted that these portions 15 are preferably of such length and conformation at their extremities that when assembled as shown in that figure, their lower ends may also engage the supporting table inside the bottom edges 7 of the member 5.

In the use of my improved construction, the blanks 5a and 8a shown in Figures 6 and 7 are shipped flat, as shown therein. Then, at the point of display, the member 5 is first formed by connecting hook 12 in the slot 13, as illustrated in Figure 3. Then, the member 8 is formed by bending down the portions 15, and the portions 17 are passed down through the slits 16; the portions 15 then extending downward into engagement with the table or the support inside the lower portion of the member 5 while pressing against opposite surfaces of that member. When thus assembled, the device is ready for the insertion of the bowl 1, which is readily inserted from the top with the lower end of the stem 3 thereof passing through the open end 6 and registering opening 9 in the member 8 until the bottom of the seal 2 is supported on the upper edge 6 of the member 5.

As a result of my improved construction, it will be evident that, while producing a very light and inexpensive construction, the latter is so formed and braced as to be substantially rigid. Further, the outline of the display device is such as very attractively to set off the outline of the bowl, while it is also made possible to utilize color on the exposed outer surface of the member 5, in such manner as thereby further to increase the attractiveness of the display. Also, it is made possible to eliminate any need for the use of adhesive or the like. When desired, it will also be evident that bowls having enlargements at the upper ends of their stems may have these supported on the portion 6 rather than the seal 2, while bowls without either enlargements or seals thereon may have their bottoms supported directly on the portion 6. These and other advantages will, however, be clearly apparent to those skilled in the art.

In Figure 8, I have illustrated a modified construction of the member 8 which may be used, if desired, the latter therein being of generally inverted cup shape, as illustrated at 18 and adhesively or otherwise suitably attached to the inside walls of the member 5 and having a stem receiving opening 9 in its top. This construction, however, is not preferred, the structure shown in Figure 7 being simpler and less expensive. If desired, in a further modified form my improved construction may also be made of metal and suitably spun and welded, or otherwise suitably connected, all hooks or flaps and slots then being unnecessary. Also, in this construction, a handle may be fixed to the outside of the member 5, as shown at 20 in Figure 9, as, for example, where it is desired to use the member 5 to support the upper bowl on a tray or table after removing it from a coffee maker. Also, as shown in that figure, a suitable removably connected drain cup, as, for example, a bayonet joint connected cup 21 on the under side of the portion 8, may be provided to receive the drip from the stem 3.

While I have herein specifically described three forms which my invention may assume in practice, it will be understood that these forms are shown for purposes of illustration, and that the invention may be modified and embodied in various other forms without departing from its spirit or the scope of the appended claims.

What I claim as new and desire to secure by Letters Patent is:

1. A support for coffee maker upper bowls comprising a hollow conical member having a reduced upper end and enlarged lower end, said member having an axial aperture through said upper end and means intermediate said upper and lower ends for positioning the lower end of a stem extended through said aperture, said conical member comprising sheet material connected at adjacent edges and said last mentioned means comprising a transverse member fixed inside the bottom of said conical member and having a stem receiving aperture therein.

2. An upper bowl supporting and displaying device comprising a conical member of sheet material interlocked at its edges and having a stem receiving aperture in its upper end, and a transverse stem positioning member inside said member and interlocked therewith and having stem positioning means registering with said aperture.

3. An upper bowl supporting and displaying device comprising a conical member of sheet material interlocked at its edges and having a stem receiving aperture in its upper end, and a transverse stem positioning member inside said member and interlocked therewith having stem positioning means registering with said aperture, said conical member having cooperating slot and hook connections along adjacent edges and said conical member and transverse member having interlocking flap and slit connections at opposite ends of said transverse member.

4. For a coffee maker upper bowl having a depending stem, a stem receiving and shrouding bowl support having an open end receiving said stem, an open bottom, internal means separably connected to said support and including a transverse portion intermediate said end and bottom for positioning said stem, and means contained within the bottom of said bowl support and separably connected to said transverse portion for receiving a drip from said stem.

FRANK E. WOLCOTT.